(12) United States Patent
Kawaguchi et al.

(10) Patent No.: US 10,513,573 B2
(45) Date of Patent: Dec. 24, 2019

(54) PROCESS FOR PRODUCING SILVER NANOWIRES AND AGENT FOR CONTROLLING GROWTH OF SILVER NANOWIRES

(71) Applicant: Seiko PMC Corporation, Tokyo (JP)

(72) Inventors: Tomoaki Kawaguchi, Ichihara (JP); Toshiyuki Hasegawa, Ichihara (JP)

(73) Assignee: Seiko PMC Corporation, Tokyo (JP)

( * ) Notice: Subject to any disclaimer, the term of this patent is extended or adjusted under 35 U.S.C. 154(b) by 11 days.

(21) Appl. No.: 15/446,486

(22) Filed: Mar. 1, 2017

(65) Prior Publication Data

US 2017/0174804 A1    Jun. 22, 2017

Related U.S. Application Data

(62) Division of application No. 13/993,694, filed as application No. PCT/JP2011/006071 on Oct. 28, 2011, now Pat. No. 9,630,250.

(30) Foreign Application Priority Data

Dec. 17, 2010 (JP) ................................ 2010-281219

(51) Int. Cl.
| | | |
|---|---|---|
| *B22F 9/16* | (2006.01) | |
| *B22F 9/24* | (2006.01) | |
| *B82Y 30/00* | (2011.01) | |
| *C08F 220/58* | (2006.01) | |
| *B22F 1/00* | (2006.01) | |
| *C08F 120/58* | (2006.01) | |
| *C08F 220/06* | (2006.01) | |
| *C08F 220/54* | (2006.01) | |

(52) U.S. Cl.
CPC .......... *C08F 220/58* (2013.01); *B22F 1/0025* (2013.01); *B22F 1/0044* (2013.01); *B22F 1/0062* (2013.01); *B22F 9/16* (2013.01); *B22F 9/24* (2013.01); *B82Y 30/00* (2013.01); *C08F 120/58* (2013.01); *C08F 220/06* (2013.01); *C08F 220/54* (2013.01); *B22F 2009/245* (2013.01); *B22F 2301/255* (2013.01); *B22F 2302/45* (2013.01); *B22F 2998/10* (2013.01)

(58) Field of Classification Search
None
See application file for complete search history.

(56) References Cited

U.S. PATENT DOCUMENTS

| | | | |
|---|---|---|---|
| 4,539,041 A | | 9/1985 | Figlarz et al. |
| 5,629,384 A | * | 5/1997 | Veronese ......... A61K 47/48176 525/326.8 |
| 6,262,129 B1 | | 7/2001 | Murray et al. |
| 7,585,349 B2 | | 9/2009 | Xia et al. |
| 2007/0074316 A1 | | 3/2007 | Alden et al. |
| 2008/0210052 A1 | | 9/2008 | Allemand |
| 2009/0196788 A1 | | 8/2009 | Wang et al. |
| 2010/0120960 A1 | | 5/2010 | Lee et al. |
| 2010/0242679 A1 | | 9/2010 | Yu et al. |
| 2011/0174190 A1 | | 7/2011 | Sepa et al. |
| 2012/0082728 A1 | * | 4/2012 | Schneider ............... B82Y 5/00 424/491 |

FOREIGN PATENT DOCUMENTS

| | | |
|---|---|---|
| CN | 101451270 A | 6/2009 |
| CN | 101678460 A | 3/2010 |
| JP | 2005248203 A | 9/2005 |
| JP | 2007138249 A | 6/2007 |
| JP | 2009203484 A | 9/2009 |
| JP | 2009215573 A | 9/2009 |
| JP | 2009215615 A | 9/2009 |
| WO | 2008143061 A1 | 11/2008 |
| WO | WO-2010084157 A2 * | 7/2010 ............... B82Y 5/00 |

OTHER PUBLICATIONS

Narumi, Macromol. Chem. Phys. vol. 210, p. 349-358. (Year: 2009).*
Caswell et al., Seedless, Surfactantless Wet Chemical Synthesis of Silver Nanowires, Nano Letters, 2003, pp. 667-669, vol. 3, No. 5.
Ducamp-Sanguesa et al., Synthesis and Characterization of Fine and Monodisperse Silver particles of Uniform Shape, Journal of Solid State Chemistry, 1992, pp. 272-280, vol. 100.
Korte et al., Rapid systhesis of silver nanowires through a CuCl- or CuCl2-mediated polyol process, Journal of Materials Chemistry, 2008, pp. 437-441, vol. 18.
Nikoobakht et al., Preparation and Growth Mechanism of Gold Nanorods (NRs) Using Seed-Mediated Growth Method, Chem. Mater., 2003, pp. 1957-1962, vol. 15.
Sun et al., Crystalline Silver Nanowires by Soft Solution Processing, Nano Letters, 2002, pp. 165-168, vol. 2, No. 2.
Wiley et al., Shape-Controlled Synthesis of Metal Nanostructures: The Case of Silver, Chemistry a European Journal, 2005, pp. 454-463, vol. 11.

* cited by examiner

*Primary Examiner* — Xiaowei Su
(74) *Attorney, Agent, or Firm* — The Webb Law Firm

(57) ABSTRACT

Provided is a process for silver nanowire production in which the major-axis length of the silver nanowires can be controlled in a wide range and an agent for controlling the growth of silver nanowires. A process for silver nanowire production which is characterized in that an agent for controlling the growth of silver nanowires which comprises a polymer obtained by polymerizing one or more polymerizable monomers comprising an N-substituted (meth)acrylamide is reacted with a silver compound in a polyol at 25-180° C. The agent for controlling the growth of silver nanowires is characterized by comprising a polymer which has units of an N-substituted (meth)acrylamide as a polymerizable monomer.

3 Claims, No Drawings

PROCESS FOR PRODUCING SILVER NANOWIRES AND AGENT FOR CONTROLLING GROWTH OF SILVER NANOWIRES

CROSS REFERENCE TO RELATED APPLICATIONS

This application is a divisional of U.S. application Ser. No. 13/993,694, filed Jun. 13, 2013, which is the United States national phase of International Application No. PCT/JP2011/006071, filed Oct. 28, 2011, which claims priority to Japanese patent application No. 2010-281219, filed Dec. 17, 2010. The disclosure of each of these documents is hereby incorporated in its entirety by reference.

TECHNICAL FIELD

The present invention relates to a process for producing silver nanowires which comprises allowing an agent for controlling the growth of silver nanowires that has a polymer obtained by polymerizing polymerizable monomers containing monomers of a N-substituted (meth)acrylamide, to react with a silver compound in a polyol at a temperature from 25 to 180° C.

BACKGROUND ART

In recent years, display devices such as liquid crystal displays, plasma displays, organic electroluminescent displays and electronic paper, input sensors such as touch panels, and solar cells utilizing sunlight such as thin film amorphous silicon solar cells and dye sensitized solar cells have been increasingly used. With the increase in use of these devices, demand for transparent conductive films, which are essential to these devices, has been increased as well.

Among others, films of ITO, a transparent oxide, or an oxide of In and Sn, are largely used. One process to produce films of ITO is application of minute particles dispersed in a solution to base films. However, vapor deposition with sputtering equipment or deposition equipment is normally employed to enhance transparency and to improve electric conductivity. On the other hand, the equipment for the deposition is massive and complicated, and the energy consumption by such equipment to produce the thin films is considerably large. Thus, the development of technologies to reduce the production cost and environmental burden has been desired. Furthermore, enlargement of the area of transparent conductive materials has been sought, which is accompanied by increasing demand for weight saving, flexibility, and lower resistance of transparent conductive materials.

Receiving the demand, researchers have been studying transparent electrically conductive films having nanowire of a metallic element, which can be produced by wet processes, and are excellent in lightness and flexibility. The nanowire of a metallic element has such a small diameter as 250 nm or less, which enables films having nanowires of a metallic element to have high optical transparency in the visible light region. Films having metallic nanowires are expected to have many applications as a transparent electric conductive film in place of films having ITO. Special attention is riveted to transparent conductive films having silver nanowires, which have high electric conductivity and stability (see, for example, patent document 1).

One process for producing silver nanowires comprises allowing a silver compound to react with polyvinylpyrrolidone, as an agent for controlling the growth of silver nanowires, in a polyol. Specifically, the following processes have been proposed: heating a silver compound with polyvinylpyrrolidone in a polyol (see, for example, patent document 2 and non-patent document 1), allowing a silver compound to react with polyvinylpyrrolidone and a quaternary ammonium chloride in a polyol (see, for example, patent document 3), allowing a silver compound to react with polyvinylpyrrolidone, iron ions, and chloride ions in a polyol (see, for example, patent document 4), and allowing a silver compound to react with polyvinylpyrrolidone, copper ions, and chloride ions (see, for example, non-patent document 2).

The transparent conductive film having silver nanowires shows electric conductivity through three-dimensional electrically conductive network structures formed by mutual contact of silver nanowires, the network structures spatially widely distributed in the film. Therefore silver nanowires whose length along their major axis has an optimal length should be employed depending on the use of the transparent conductive film. When silver nanowires are produced with polyvinylpyrrolidone as an agent for controlling the growth of silver nanowires, proposed is a process of controlling the length of silver nanowires along their major axis by adjusting the ratio of the mass of silver atoms to that of chloride ions (see, for example, patent document 5). However, the length along the major axis of the silver nanowires realized by this process is about 100 μm at most. Another proposal to address this problem is a process where concentrated nitric acid is used to lengthen the length of silver nanowires along their major axis (see, for example, patent document 4). This process, however, is capable of controlling the length of silver nanowires to approximately 300 μm at most. Besides, this process requires adding concentrated nitric acid at 130° C., which causes problems of reproducibility and safety. When silver nanowires are produced by a process using polyvinylpyrrolidone as an agent for controlling the growth of silver nanowires, it is difficult to widely control the length of silver nanowires along their major axis in the region where the length is not less than 100 μm.

PRIOR ART DOCUMENTS

Patent Documents

Patent Document 1: US 2007/0074316 A
Patent Document 2: U.S. Pat. No. 7,585,349 B
Patent Document 3: US 2008/0210052 A
Patent Document 4: US 2009/0196788 A
Patent Document 5: JP 2009-215573 A

Non-patent Documents

Non-patent Document 1: Journal of Solid State Chemistry, 1992, 100, pp. 272-280
Non-patent Document 2: Journal of Materials Chemistry, 2008, 437, pp. 437-441

DISCLOSURE OF THE INVENTION

Problems to be Solved by the Invention

The objective of the present invention is to provide a process for producing silver nanowires capable of producing various silver nanowires at will, from those having a short length to a long length, along their major axis, by changing manufacturing conditions, and an agent for controlling the growth of silver nanowires.

Means to Solve the Problems

As a result of intensive study to achieve the aforementioned objective, the inventors of the present invention found that a process for producing silver nanowires which allowed an agent for controlling the growth of silver nanowires that had a polymer obtained by polymerizing polymerizable monomers containing monomers of a N-substituted (meth)acrylamide to react with a silver compound in a polyol at a temperature from 25 to 180° C. provided silver nanowires having a length along their major axis that was longer than conventional silver nanowires had, whereby the process, with the manufacturing conditions changed, was capable of producing a variety of silver nanowires, from those having a short length to along length. The inventors completed the present invention based these findings.

The present invention, or means for solving the aforementioned problem, provides:

(1) A process for producing silver nanowires comprising allowing an agent for controlling the growth of silver nanowires that has a polymer obtained by polymerizing polymerizable monomers containing monomers of a N-substituted (meth)acrylamide, to react with a silver compound in a polyol at a temperature from 25 to 180° C.
(2) The process for producing silver nanowires according to means (1), wherein the reaction is carried out in the presence of chloride ions.
(3) The process for producing silver nanowires according to means (1) or (2), wherein the silver nanowires are produced in an environment shielded from light.
(4) The process for producing silver nanowires according to any one of means (1)-(3), wherein the polymer is produced by polymerizing from 60 to 100% by mass of the monomers of the N-substituted (meth)acrylamide and from 40 to 0% by mass of other polymerizable monomers.
(5) The process for producing silver nanowires according to any one of means (1)-(4), wherein the polymer has a weight average molecular weight in a range of 8,000 to 4,000,000.
(6) The process for producing silver nanowires according to any one of means (1)-(5), wherein the N-substituted (meth) acrylamide is represented by general formula (1), or N-acryloylmorpholine.

[Formula 1]

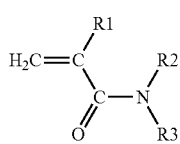

(wherein R1 denotes a hydrogen atom or a methyl group, R2 a hydrogen atom or an alkyl group having 1-6 carbon atoms, and R3 an alkyl group or hydroxyalkyl group having 1-5 carbon atoms.)
(7) The process for producing silver nanowires according to any one of means (1)-(6), wherein the silver nanowires have a length along their major axis controllable from 0.5 to 1000 μm.
(8) An agent for controlling the growth of silver nanowires comprising a polymer obtained by polymerizing polymerizable monomers that contain monomers of a N-substituted (meth)acrylamide.

(9) The agent for controlling the growth of silver nanowires according to means (8), wherein the polymer is produced by polymerizing from 60 to 100% by mass of the monomers of the N-substituted (meth)acrylamide and from 40 to 0% by mass of other polymerizable monomers.
(10) The agent for controlling the growth of silver nanowires according to means (8) or (9), wherein the polymer has a weight average molecular weight in a range of 8,000 to 4,000,000.
(11) The agent for controlling the growth of silver nanowires according to anyone of means (8)-(10), wherein the N-substituted (meth)acrylamide is represented by general formula (2), or N-acryloylmorpholine.

[Formula 2]

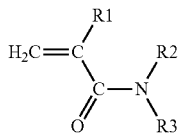

(wherein R1 denotes a hydrogen atom or a methyl group, R2 a hydrogen atom or an alkyl group having 1-6 carbon atoms, and R3 an alkyl or hydroxyalkyl group having 1-5 carbon atoms.)

In this specification "(meth)acrylamide" denotes "acrylamide" and "methacrylamide". This abbreviation may also be used in the following portion of the specification.

Advantages of the Invention

The present invention provides a process for producing silver nanowires capable of producing silver nanowires that have various lengths along their major axis as the manufacture chooses, from a short length, which conventional silver nanowires typically have, to a long length, by changing the manufacturing conditions, and an agent for controlling the growth of silver nanowires used in the process.

DESCRIPTION OF EMBODIMENTS

We will explain the present invention in detail hereinafter.

The "silver nanowires" of the present invention each have a structure whose section has a diameter of less than 1 μm and whose aspect ratio, or the ratio (the length along the major axis)/(the diameter), is less than 2. The "nanoparticles" of the present invention each have a structure whose section has a diameter of less than 1 μm and whose aspect ratio, or the ratio (the length along the major axis)/(the diameter), is less than 2.

[Diameter of Silver Nanowires]

When silver nanowires are applied to transparent conductive films, those with a smaller diameter are advantageous and preferable to enhance transparency of the films. Silver nanowires for the present invention should desirably have a diameter less than 250 nm, more desirably less than 150 nm, particularly desirably less than 100 nm. The diameter is an arithmetic mean of the respective diameters of 100 silver nanowires, which may be obtained by observation with a scanning electron microscope.

[Length of Silver Nanowires Along their Major Axis]

The transparent conductive film including silver nanowires exhibits electric conductivity through three-dimensional electrically conductive network structures formed by mutual contact of silver nanowires, the network structures spatially widely distributed in the film. Thus preferable are silver nanowires with an optimal length along their major axis depending on the use of the film. Silver nanowires for the present invention should preferably have a length along their major axis from 0.5 to 1000 μm. The length is an arithmetic mean of the respective lengths of 100 silver nanowires along their major axis, which may be obtained by observation with a scanning electron microscope.

[Polyol]

Any polyol may be used for the present invention as long as it is a compound capable of reducing silver ions. At least one compound may be suitably selected from the group of compounds that have two hydroxyl groups in one molecule, depending on the application of the resulting silver nanowires. Examples of the polyol that are suitably used in the present invention may include diols, such as ethylene glycol, propylene glycols (isomers taken into account), butanediols (isomers taken into account), pentanediols (isomers taken into account), hexanediols (isomers taken into account), diethylene glycol, dipropylene glycols (isomers taken into account), triethylene glycols (isomers taken into account), and tripropylene glycols (isomers taken into account); triols, such as glycerin, butanetriols (isomers taken into account), pentanetriols (isomers taken into account), and hexanetriols (isomers taken into account); tetrols, such as butanetetrols (isomers taken into account), pentanetetrols (isomers taken into account), and hexanetetrols (isomers taken into account); pentols, such as pentanepentols (isomers taken into account), and hexanepentols (isomers taken into account); and hexols such as hexanehexols (isomers taken into account). Among them preferable are diols of saturated hydrocarbons having 1-5 carbon atoms, such as ethylene glycol, 1,2-propanediol, and 1,3-propanediol, and triols of saturated hydrocarbons such as glycerin, because they are liquid at normal temperature and the agent for controlling the growth of silver nanowires is easily dissolved in them. Polyols may also be used as solvent.

[Solvent]

Into the system of the present invention may be added a solvent other than the polyol in such an amount that the solvent neither lowers the solubility of the agent for controlling the growth of silver nanowires nor arrests the formation of silver nanowires. Examples of the solvent may include water; alcohols such as methanol, propanols (isomers taken into account), butanols (isomers taken into account), pentanols (isomers taken into account), hexanols (isomers taken into account), cyclohexanol, and benzyl alcohol; ketones such as methyl ethyl ketone and methyl isobutyl ketone; esters such as ethyl acetate, amyl acetate, ethyl propionate, propylene glycol diacetate; ethers such as ethylene glycol monomethyl ether, ethylene glycol dimethyl ether, ethylene glycol monoethyl ether, diethylene glycol monomethyl ether, diethylene glycol monoethyl ether, diethylene glycol dimethyl ether, ethylene glycol monomethyl ether acetate, ethylene glycol monoethyl ether acetate, propylene glycol monomethyl ether, ethylene glycol mono-n-butyl ether, diethylene glycol mono-n-butyl ether, propylene glycol dimethyl ether, propylene glycol monomethyl ether acetate, dipropylene glycol monomethyl ether, dipropylene glycol dimethyl ether, dipropylene glycol monomethyl ether acetate, tripropylene glycol monomethyl ether acetate, propylene glycol mono-n-propyl ether, propylene glycol mono-n-butyl ether, dipropylene glycol mono-n-butyl ether, tripropylene glycol mono-n-butyl ether, propylene glycol monophenyl ether, tetrahydrofuran, and dioxane; amides such as formamide, acetamide, N,N-dimethylformamide, N,N-dimethylacetamide, and N-methyl-2-pyrrolidinone; and organic sulfur compounds such as dimethyl sulfoxide.

[Silver Compound]

Any silver compound may be used for the present invention as long as it is reduced by the polyol. At least one of such compounds may be suitably selected depending on the application of the resulting silver nanowires. Specific examples of the silver compound may include salts of inorganic acids such as silver nitrate, silver chloride, silver sulfate, silver sulfamate, silver chlorate, and silver perchlorate; and salts of organic acids such as silver acetate and silver lactate. Among them preferable are silver salts of inorganic acids such as silver nitrate.

[Agent for Controlling the Growth of Silver Nanowires]

The agent for controlling the growth of silver nanowires according to the present invention has a polymer obtained by polymerizing polymerizable monomers, and the monomers containing at least monomers of a N-substituted (meth) acrylamide. There is no special limitation on the N-substituted (meth) acrylamide used in this invention, as long as at least one hydrogen atom bonded with the nitrogen atom of (meth)acrylamide is replaced with at least one functional group such as an alkyl group, an aryl group, and an alkoxyalkyl group. The polymer may be in the form of a straight-chain, or some of the chains may be crosslinked to such an extent that the solubility thereof in the solvent is not hampered. Also, the agent for controlling the growth of silver nanowires may include copolymers obtained by copolymerizing N-substituted (meth)acrylamide monomers and monomers other than N-substituted (meth)acrylamide monomers, in such a degree that the existence of such copolymers neither hinders the agent from being dissolved in the polyol nor arrests the formation of silver nanowires. Furthermore, the agent may include a mixture of a homopolymer of the N-substituted (meth)acrylamide monomers and other polymers.

The N-substituted (meth)acrylamide is classified broadly into N-mono-substituted (meth) acrylamide where only one of the hydrogen atoms bonded with the nitrogen atom of (meth)acrylamide is replaced, and N, N-di-substituted (meth) acrylamide including N,N-symmetrical-di-substituted (meth)acrylamide where two of the hydrogen atoms bonded with the nitrogen atom are replaced with a same group, N,N-unsymmetrical-di-substituted (meth)acrylamide where two of the hydrogen atoms bonded with the nitrogen atom are replaced with different groups, and N,N-cyclosubstituted (meth)acrylamide where two of the hydrogen atoms bonded with the nitrogen atom are replaced with a single group to form a ring.

Specific examples of the N-mono-substituted (meth) acrylamide may include: N-monoalkyl-substituted (meth)acrylamides such as N-methyl(meth) acrylamide, N-ethyl(meth) acrylamide, N-isopropyl(meth)acrylamide, N-tert-butyl (meth)-acrylamide, and N-octyl(meth)acrylamide; N-monocyclo-alkyl-substituted (meth)acrylamides such as N-cyclohexyl(meth)acrylamide; N-monoaryl-substituted (meth) acrylamides such as N-phenyl(meth)acrylamide and N-naphtyl-(meth)acrylamide; N-monoarylalkyl-substituted (meth)acrylamides such as N-benzyl(meth)acrylamide and N-phenylethyl-(meth)acrylamide; N-(saturated polycycloalkyl)-substituted (meth)acrylamides such as N-norbornyl(meth)acrylamide and N-noradamantyl (meth)acrylamide; N-monohydroxyalkyl-substituted (meth)acrylamides such as N-hydroxymethyl-(meth)acrylamide, N-(2-hydroxyethyl) (meth)acrylamide, and N-(3-hydroxypropyl) (meth)acrylamide; N-monohydroxycylclo-alkyl-substituted (meth)acrylamides such as N-(4-hydroxycyclohexyl) (meth)

acrylamide and N-(2-hydroxycyclohexyl)-(meth)acrylamide; N-monohydroxyaryl-substituted (meth)acrylamides such as N-(4-hydroxyphenyl) (meth)acrylamide and N-(2-hydroxyphenyl) (meth) acrylamide; N-monoalkoxy-alkyl-substituted (meth) acrylamides such as N-methoxymethyl-(meth)acrylamide, N-ethoxymethyl(meth)acrylamide, N-n-butoxymethyl(meth)acrylamide, N-isobutoxymethyl-(meth)acrylamide, N-methoxyethyl(meth)acrylamide, N-ethoxyethyl(meth)acrylamide, N-n-butoxyethyl(meth)acrylamide, N-isobutoxyethyl(meth)acrylamide, N-methoxypropyl-(meth)acrylamide, N-ethoxypropyl(meth)acrylamide, and N-n-butoxypropyl(meth)acrylamide; N-(keto group-including group)-substituted (meth)acrylamides such as N-(1,1-dimethyl-3-oxobutyl) (meth)acrylamide and N-(2-acetoacetoxyethyl)-(meth)acrylamide; and N-dialkylaminoalkyl (meth)acrylamides such as N-dimethylaminopropyl(meth)acrylamide.

Specific examples of the N,N-symmetrical-di-substituted (meth)acrylamide may include: N,N-dialkyl-substituted (meth)acrylamide such as N,N-dimethyl(meth)acrylamide, N,N-diethyl(meth)acrylamide, N,N-diisopropyl(meth)acrylamide, N,N-dibutyl(meth)acrylamide, and N,N-dioctyl(meth)-acrylamide; N,N-dicycloalkyl-substituted (meth)acrylamide such as N,N-dicyclohexyl(meth)acrylamide; N,N-diaryl-substituted (meth)acrylamides such as N,N-diphenyl-(meth)acrylamide; N,N-diarylalkyl-substituted (meth)acrylamides such as N,N-dibenzyl(meth)acrylamide; N,N-bis(hydoxyalkyl)-substituted (meth)acrylamides such as N,N-bis(hydroxyethyl) (meth)acrylamide; and N,N-bis (alkoxy-alkyl)-substituted (meth)acrylamides such as N,N-bis (methoxyethyl) (meth)acrylamide.

Among them preferable are N,N-dialkyl-substituted (meth)acrylamides, and particularly preferable are N,N-symmetrical-dialkyl-substituted (meth)acrylamides wherein the alkyl group preferably has 1-3 carbon atoms.

Specific examples of the N,N-unsymmetrical-di-substituted (meth)acrylamide may include: N-methyl-N-ethyl (meth)acrylamide, N-methyl-N-isopropylacrylamide, N-methyl-N-hydroxymethyl(meth)acrylamide, N-methyl-N-(2-hydroxyethyl) (meth)acrylamide, N-(cyclohexyl)-N-(2-hydroxyethyl) (meth)acrylamide, N-methyl-N-phenyl-(meth)acrylamide, N-benzyl-N-(2-hydroxyethyl)-(meth)acrylamide, and N-methyl-N-methoxymethyl-(meth)acrylamide.

Specific examples of the N,N-cyclo-substituted acrylamide may include N-(meth)acryloylmorpholine, N-(meth)acryloylpiperidine, and N-(meth)acryloyl-pyrrolidine.

Among them, N,N-dimethylacrylamide, N,N-diethylacrylamide, N-(2-hydroxyethyl)acrylamide, and N-acryloylmorpholine are preferable, because polymers produced from them are satisfactorily dissolved in the polyol and the polymers enable silver nanowires to be formed favorably. Among them particularly preferable is N-(2-hydroxyethyl) acrylamide.

Among the N-substituted (meth)acrylamides listed above, preferable are those represented by general formula (3), specific examples of which are N-hydroxymethyl(meth) acrylamide, N-(2-hydroxyethyl) (meth)acrylamide, N-(3-hydroxypropyl)-(meth)acrylamide, N-methyl-N-hydroxymethyl(meth)acrylamide, and N-methyl-N-(2-hydroxyethyl) (meth)acrylamide.

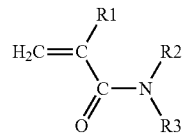

[Formula 3]

(wherein R1 denotes a hydrogen atom or a methyl group, R2 a hydrogen atom or an alkyl group having 1-6 carbon atoms, and R3 an alkyl group or hydroxyalkyl group having 1-5 carbon atoms.)

Examples of the other monomers that are capable of being copolymerized with the N-substituted (meth)acrylamide monomers may include: esters of (meth)acrylic acid such as ethyl (meth)acrylate, butyl (meth)acrylates (isomers taken into account), 2-ethylhexyl (meth)acrylate, cyclohexyl (meth)acrylate, phenyl (meth)acrylate, benzyl (meth)acrylate, isobornyl (meth)acrylate, and dimethylaminoethyl (meth)acrylate; aromatic vinyl compounds such as styrene, α-methylstyrene, and vinylnaphthalene; N-non-substituted (meth) acrylamides such as (meth) acrylamide; vinyl carboxylates such as vinyl acetate, vinyl propionate, vinyl butyrate, vinyl cyclohexanecarbonate, vinyl benzoate, vinyl cinnamate, and vinyl sorbate; unsaturated carboxylic acids such as (meth) acrylic acid, crotonic acid, maleic acid, fumaric acid, itaconic acid, and aconitic acid; (meth)allyl compounds such as (meth)allyl alcohol, (meth)allylsulfonic acid, and (meth) allylamine; N-vinylcarboxylic acid amides such as N-vinylformamide, N-vinylacetamide, and N-vinylpropionamide; and heterocyclic compounds having a vinyl group such as 2-vinylpyridine, 4-vinylpyridine, N-vinylimidazole, and N-vinylcarbazole. Ionic monomers may include their salts.

When the polymer is a copolymer of N-substituted (meth) acrylamide monomers and other polymerizable monomers, the polymer should preferably have from not less than 60% by mass to less than 100% by mass of the monomer units derived from the N-substituted (meth)acrylamide monomers and from more than 0% by mass to less than 40% by mass of the monomer units derived from the other polymerizable monomers. The polymer having a composition within this range is capable of controlling the length of silver nanowires along their major axis more easily. This preferable polymer may be produced by polymerizing from 60 to 100% by mass of monomers of a N-substituted (meth) acrylamide and from 40 to 0% by mass of other polymerizable monomers.

In order to produce the polymer included in the agent for controlling the growth of silver nanowires according to the present invention may be employed conventionally known various processes. For example, a reactor equipped with a stirrer, a thermometer, a reflux condenser, and a nitrogen gas-introducing tube is charged with monomers of a N-substituted (meth)acrylamide, other copolymerizable monomers, and a solvent. Subsequent to an addition of a polymerization initiator to the contents of the reactor, the contents are allowed to react at temperatures from 20 to 100° C. for 0.5 to 12 hours, whereby the polymer is produced. Any one of suitable polymerizations such as solution polymerization, suspension polymerization, emulsion polymerization, and precipitation polymerization may be employed for the production of the polymer. The reaction operation may be any one of batch reaction, semibatch reaction, and consecutive reaction. For the solvent may be employed any known solvent as long as the polymerization reaction is able to be carried out in it. Specific examples of the solvent may include: water, ethanol, 2-propanol, methyl ethyl ketone, ethylene glycol, propylene glycol, ethylene glycol monomethyl ether, propylene glycol monomethyl ether, diethylene glycol monomethyl ether, and dipropylene glycol monomethyl ether. For the polymerization initiator may be used a conventionally known substance, specific examples of which may include: persulfates such as ammonium persulfate, sodium persulfate, and potassium persulfate; peroxides such as tert-butyl hydroperoxide, cumene hydroperoxide, benzoyl peroxide, and lauroyl peroxide; redox initiator systems comprising combinations of persulfates or peroxides with reducing agents such as sulfites, bisulfites, thiosulfates, sodium formaldehyde sulfoxylate, ferrous sulfate, ammonium ferrous sulfate, glucose, and ascorbic acid; azo compounds such as 2,2'-azobisisobutyronitrile, 2,2'-azobis(2,4-dimethyl-valeronitrile), 2,2'-azobis(2-methylbutyronitrile), dimethyl 2,2'-azobis(2-methylpropionate), and 2,2'-azobis(2-amidinopropane) dihydrochloride; photoinitiators such as benzophenone; and polymerization initiator systems comprising combinations of these initiators including the persulfates, the peroxides, the redox initiators, the azo compounds, and the photoinitiators. The polymer should preferably have a weight average molecular weight from 8,000 to 4,000,000, because such polymer is capable of controlling the length of silver nanowires along their major axis more easily. In order to adjust the molecular weight of the polymer, may be employed a conventionally known chain-transfer agent. Specific examples of the chain-transfer agent may include: thiols such as mercaptoethanol, laurylmercaptan, thioglycerin, thioglycolic acid, mercaptopropionic acid, and mercaptosuccinic acid; alcohols such as 2-propanol; (meth)allyl compounds such as allylsulfonic acid, methallylsulfonic acid, and allyl alcohol; and phosphinates such as sodium phosphinate. The polymer included in the agent for controlling the growth of silver nanowires according to the present invention may be used as produced, or with the solvent for the polymerization. Alternatively, the product including the polymer may be dried by suitable methods such as heating, spray drying, drying under reduced pressure, or freeze-drying, and used in a dried and solidified state.

[Chloride Ions]

The chloride ions employed by the present invention may be formed by dissolving inorganic salts or organic salts in a polar solvent. Specific examples of the salts from which chloride ions are formed may include: alkaline metal chlorides such as lithium chloride, sodium chloride, and potassium chloride; alkaline earth metal chlorides such as magnesium chloride and calcium chloride; earth metal chlorides such as aluminum chloride; chlorides of zinc group metals such as zinc chloride; chlorides of carbon group metals such as tin chloride; chlorides of transition metals such as manganese chloride, iron chloride, cobalt chloride, and zirconium oxychloride; amine hydrochlorides such as ammonia hydrochloride, which may also be called ammonium chloride, hydrazine hydrochloride, methylamine hydrochloride, dimethylamine hydrochloride, trimethylamine hydrochloride, ethylamine hydrochloride, diethylamine hydrochloride, triethylamine hydrochloride, propylamine hydrochloride, dipropylamine hydrochloride, tripropylamine hydrochloride, butylamine hydrochloride, dibutylamine hydrochloride, tributylamine hydrochloride, pentylamine hydrochloride, hexylamine hydrochloride, ethanolamine hydrochloride, diethanolamine hydrochloride, triethanolamine hydrochloride, dimethylethanolamine hydrochloride, methyldiethanolamine hydrochloride, cyclohexylamine hydrochloride, ethylenediamine hydrochloride, diethyleneteramine hydrochloride, triethylenepentamine hydrochloride, anilinium chloride, toluidine hydrochloride, glucosamine hydrochloride, and acetamidine hydrochloride; amino acid hydrochlorides such as alanine hydrochloride, arginine hydrochloride, lysine hydrochloride, cysteine hydrochloride, glutamic acid hydrochloride, ornithine hydrochloride, and cystine dihydrochloride; and phosphonium chlorides such as tetrabutylphosphonium chloride, methoxymethyl triphenylphosphonium chloride, and benzyltriphenyl-phosphonium chloride. Among them, lithium chloride, sodium chloride, zirconium oxychloride, methoxymethyl triphenylphosphonium chloride, and ammonium chloride are desirable. Among the desirable, ammonium chloride is more desirable, because residual salts are easily removed and the process using ammonium chloride produces silver nanowires favorably.

[Other Additives]

Other additives may also be added to the reactants as the occasion demands, in such an amount that the additives do not hamper the growth of silver nanowires. Examples of the additives include: surfactants and/or macromolecule thickeners to help silver nanowires be dispersed in the film, sulfuration inhibitors to prevent silver nanowires to be sulfurized, and acid components including inorganic acids and organic acids and alkaline components including ammonia, amines and metal hydroxides to adjust the hydrogen ion concentration of the system.

[Process for Producing Silver Nanowires]

The following are generally known as processes for producing silver nanowires: a process comprising reducing, with a reducing agent, a small portion of silver ions to silver metal nanoparticles, which serve as crystalline nuclei in the next step, and adding the silver ions and the reducing agent successively to allow the crystalline nuclei to grow to silver nanowires, which process will hereinafter be abbreviated to the successive addition and development method; and a process comprising reducing all the silver ions into silver metal nanoparticles, and ripening the silver metal nanoparticles by Ostwald ripening so that they grow into wires, which process will hereinafter be abbreviated to the ripening and developing method. For the present invention may be employed either of the successive addition and development method and the ripening and developing method. Also, for the reaction operation may be employed any one of batch reaction, semibatch reaction, and consecutive reaction. The process according to the present invention is capable of producing silver nanowires safely, because hazardous substances such as concentrated nitric acid are not involved in the process.

[Shielding Conditions]

The process for producing silver nanowires according to the present invention may be carried out in an environment either shielded or not shielded from light, as long as silver nanowires are capable of being formed. However, they should preferably be produced in an environment shielded from light. Silver nanowires produced in an environment not shielded from light tend to have thicker diameters.

[Reaction Temperature]

Although silver nanowires may be produced by the process of the invention at any feasible reaction temperature or at temperatures at which silver nanowires are capable of being formed, the reaction temperature should preferably ranges from 25 to 180° C. It may take a process carried out at a temperature under 25° C. too long time to form silver nanowires, whereas a process carried out at a temperature over 180° C. may change the agent for controlling the growth of silver nanowires in quality.

[Reaction Time]

A reaction time may be determined at the manufacturer's discretion as long as silver nanowires are capable of being formed. From the viewpoint of the production cost, however, the reaction time should preferably be not more than 72 hours.

[Method of Introducing Raw Materials]

Raw materials used in the process for producing silver nanowires according to the present invention may be introduced into the reactor after each of them is dissolved in a solvent to be used. Alternatively, the reactor may be charged with a solvent first and then with each of the raw materials. Because it enables the raw materials to be easily mixed homogeneously, the reactor should be charged with the raw materials each of which that has been dissolved in the solvent in advance. When the solutions including the respective raw materials are introduced into the reactor, each solution may be dripped to the reactor or the entirety of each solution may be introduced all at once. Although there is no special limitation on the order of introducing the solutions including the respective raw materials, silver compounds dissolved in the solvent should be introduced into the reactor last, after the agent for controlling the growth of silver nanowires, salts including chloride ions, and other additives each dissolved in the solvent are placed in the reactor; this order facilitates the formation of better silver nanoparticles in an early stage of the reaction.

[Concentration of Silver Compounds in the Reaction System]

The concentration of the silver compounds in the reaction system of the process according to the present invention should desirably from 0.0006 to 2 mol/kg, more desirably from 0.006 to 0.8 mol/kg, because this concentration results in the formation of favorable silver nanowires. When the concentration is less than 0.0006 mol/kg, the amount of the produced silver nanowires becomes small to such an extent that the production cost becomes too large. On the other hand, when the concentration exceeds 2 mol/kg, the production of silver nanowires in a favorable state turns difficult.

[Concentration of Agent for Controlling the Growth of Silver Nanowires in the Reaction System]

The concentration of the agent for controlling the growth of silver nanowires in the reaction system of the process according to the present invention should desirably from 0.001 to 2.5 mol/kg, more desirably from 0.01 to 1.0 mol/kg, because this concentration results in the formation of favorable silver nanowires. When the concentration is less than 0.001 mol/kg, the production of silver nanowires in a favorable state becomes difficult. On the other hand, when the concentration exceeds 2.5 mol/kg, the production of silver nanowires in a favorable state turns difficult. Besides, when silver nanowires are isolated from the product mixture, the operation for removing the agent for controlling the growth of silver nanowires becomes complicated, which increases the production cost.

[Concentration of Chloride Ions in the Reaction System]

The concentration of the chloride ions in the reaction system of the process according to the present invention should desirably from 0.01 to 50 mmol/kg, more desirably from 0.05 to 10 mmol/kg, particularly preferably from 0.05 to 0.15 mmol/kg, from the viewpoint of the formation of favorable silver nanowires. When the concentration exceeds 50 mmol/kg, the production of silver nanowires in a favorable state becomes difficult.

The process for producing silver nanowires according to the present invention enables the manufacturer to control the length of the silver nanowires along their major axis at will. Thus, the silver nanowires produced by the process of the present invention may be used, for example, to form transparent conductive films, which will be widely applied to various devices such as materials for electrodes of liquid crystal displays, plasma displays, organic electroluminescent displays, electronic paper, touch panels, thin film amorphous silicon solar cells, and dye sensitized solar cells; electromagnetic shielding materials; and antistatic materials.

EXAMPLES

The invention will be explained by way of working examples of the present invention in the following. Needless to say, the invention is not limited to these examples. In the working and comparative examples, "parts" and "%" are on a mass basis, unless otherwise noted. In the examples given below, the diameter of the silver nanowires, the length thereof along their major axis, and the weight average molecular weight of the agent for controlling the growth of silver nanowires were measured by the methods to be explained hereinafter.

[Refinement of Silver Nanowires]

To the product liquid was added ion-exchanged water. After silver nanowires settled, the supernatant liquid was removed and dumped. Subsequently, ion-exchanged water was poured to re-disperse the silver nanowires in the water. This series of operations was repeated several times. Then, the silver nanowires were isolated and refined.

[Diameter of Silver Nanowires]

One hundred refined silver nanowires were observed with a scanning electron microscope (SEM), a JSM-5610LV microscope manufactured by JEOL, Ltd., and the respective diameters thereof were measured. The arithmetic mean of the measured diameters was regarded as the diameter of the silver nanowires.

[Length of Silver Nanowires Along their Major Axis]

One hundred refined silver nanowires were observed with a scanning electron microscope (SEM), a JSM-5610LV microscope manufactured by JEOL, Ltd., and the respective lengths thereof along their major axis were measured. The arithmetic mean of the measured lengths was regarded as the length of the silver nanowires.

[Weight Average Molecular Weight of the Agent for Controlling the Growth of Silver Nanowires]

The weight average molecular weight of the agent for controlling the growth of silver nanowires was obtained by GPC-MALS with an Agilent 1100 HPLC system (manufactured by Agilent Technologies, Inc.).

Synthesis Examples of Agent for Controlling the Growth of Silver Nanowires

Synthesis Example 1: Synthesis of Polymer to be Used as Agent for Controlling the Growth of Silver Nanowires A four-necked flask equipped with a stirrer, a thermometer, a reflux condenser, and a nitrogen gas-introducing tube, was charged with 150 parts by mass of N-(2-hydroxyethyl)acrylamide and 840 parts by mass of ion-exchanged water. While nitrogen gas was being introduced into the flask, the temperature of the contents was raised to 50° C. Then, 5 parts by mass of a 5 mass % aqueous solution of ammonium persulfate and 5 parts by mass of a 5 mass % aqueous solution of sodium bisulfite were added to the contents. The reactants were allowed to react at 80° C. for three hours.

Thus N-(2-hydroxyethyl)acrylamide polymer was produced. The weight average molecular weight of the produced polymer is shown in Table 1.

Synthesis Examples 2-13: Synthesis of Polymers to be Used as Agent for Controlling the Growth of Silver Nanowires Agents for controlling the growth of silver nanowires were produced by the same method as in Synthesis Example 1, except that the conditions were changed in the ways as shown in Table 1. The respective weight average molecular weights of the produced copolymers are shown in Table 1.

TABLE 1

|  | Kinds of Monomers | Ratio of M1/M2*[1] | Monomers (parts by mass) | Solution A*[2] (parts by mass) | Solution B*[3] (parts by mass) | WAMW*[4] |
|---|---|---|---|---|---|---|
| S.E.*[5] 1 | N-(2-HE)AA*[6] | 100 | 150 | 5 | 5 | 500,000 |
| S.E. 2 | N-(2-HE)AA/ N,N-DMAA*[7] | 50/50 | 150 | 4 | 4 | 580,000 |
| S.E. 3 | N-(2-HE)AA/ N-AM*[8] | 50/50 | 150 | 5 | 5 | 420,000 |
| S.E. 4 | N-(2-HE)AA/ MM*[9] | 90/10 | 150 | 5 | 5 | 450,000 |
| S.E. 5 | N,N-DMAA | 100 | 150 | 4 | 4 | 550,000 |
| S.E. 6 | N,N-DMAA/ N-AM | 50/50 | 150 | 5 | 5 | 480,000 |
| S.E. 7 | N-AM | 100 | 150 | 5 | 5 | 360,000 |
| S.E. 8 | N,N-DEAA*[10] | 100 | 150 | 4 | 4 | 425,000 |
| S.E. 9 | N,N-DEAA | 100 | 150 | 15 | 15 | 7,500 |
| S.E. 10 | N,N-DMAA | 100 | 150 | 0.5 | 0.5 | 4,600,000 |
| S.E. 11 | N,N-DMAA/ AA*[11] | 60/40 | 150 | 1 | 1 | 4,350,000 |
| S.E. 12 | N,N-DMAA/ AA | 50/50 | 150 | 1 | 1 | 4,200,000 |
| S.E. 13 | Acrylamide | 100 | 150 | 8 | 8 | 468,000 |

Notes:
*[1]M1/M2 stands for the ratio of the mass of the N-substituted (meth)acrylamide of the invention to mass of the other monomer in each synthesis example.
*[2]Solution A denotes the 5 mass % aqueous solution of ammonium persulfate.
*[3]Solution B denotes the 5 mass % aqueous solution of sodium bisulfite.
*[4]WAMW stands for Weight Average Molecular Weight.
*[5]S.E. stands for Synthesis Example.
*[6]N-(2-HE)AA stands for N-(2-hydroxyethyl)acrylamide.
*[7]N,N-DMAA stands for N,N-dimethylacrylamide.
*[8]N-AM stands for N-acryloylmorpholine.
*[9]MM stands for methyl methacrylate.
*[10]N,N-DEAA stands for N,N-diethylacrylamide.
*[11]AA stands for acrylic acid.

Synthesis Example 14: Synthesis of Polymer to be Used as Agent for Controlling the Growth of Silver Nanowires A four-necked flask equipped with a stirrer, a thermometer, a reflux condenser, and a nitrogen gas-introducing tube, was charged with 90 parts by mass of N,N-dimethylacrylamide, 60 parts by mass of methyl methacrylate, and 824 parts by mass of methylethyl ketone. While nitrogen gas was being introduced into the flask, the temperature of the contents was raised to 50° C. Then, 20 parts by mass of a 5 mass % aqueous dispersion of dimethyl 2,2'-azobis (2-methylpropionate) and 6 parts by mass of a 5 mass % aqueous solution of mercaptoethanol were added to the contents. The reactants were allowed to react at 80° C. for three hours. Thus a copolymer of N,N-dimethylacrylamide and methyl methacrylate was produced. The weight average molecular weight of the produced copolymer is shown in Table 2.

Synthesis Example 15: Synthesis of Polymer to be Used as Agent for Controlling the Growth of Silver Nanowires An agent for controlling the growth of silver nanowires was produced by the same method as in Synthesis Example 14, except that the conditions were changed in the ways as shown in Table 2. The weight average molecular weight of the produced copolymer is shown in Table 2.

TABLE 2

| Kinds of Monomers | Ratio of M1/M2*[1] | Monomers (parts by mass) | Dispersion C*[12] (parts by mass) | Solution D*[13] (parts by mass) | WAMW*[4] |
|---|---|---|---|---|---|
| S.E.*[5] 14  N,N-DMAA*[7]/MM*[9] | 60/40 | 150 | 20 | 6 | 7,000 |
| S.E. 15  N,N-DMAA/MM*[9] | 50/50 | 150 | 20 | 6 | 7,200 |

Notes:
*[1]M1/M2 stands for the ratio of the mass of the N-substituted (meth)acrylamide of the invention to mass of the other monomer in each synthesis example.
*[4]WAMW stands for Weight Average Molecular Weight.
*[5]S.E. stands for Synthesis Example.
*[7]N,N-DMAA stands for N,N-dimethylacrylamide.
*[9]MM stands for methyl methacrylate.
*[12]Dispersion C denotes the 5 mass % aqueous dispersion of dimethyl 2,2'-azobis(2-methylpropionate).
*[13]Solution D denotes the 5 mass % aqueous solution of mercaptoethanol.

Examples of Producing Silver Nanowires

Working Example 1: Production of Silver Nanowires

In an environment shielded from light, 0.52 part by mass of the N-(2-hydroxyethyl)acrylamide polymer that had been produced in Synthesis Example 1, and 98.5 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 2: Production of Silver Nanowires

In an environment shielded from light, 1.04 parts by mass of the N-(2-hydroxyethyl)acrylamide polymer that had been produced in Synthesis Example 1, and 97.9 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of 1,2-propanediol and 0.0016 part by mass of ammonium chloride. The temperature of the resulting mixture was raised to 140° C., and the mixture was stirred for 15 minutes. To the mixture 40.0 parts by mass of 1,2-propanediol and 1.02 parts by mass of silver nitrate were further added, and the resultant was stirred for 30 minutes at 140° C. Silver nanowires were thus produced. The properties of the produced silver nanowires were measured. The results are shown in Table 3.

Working Example 3: Production of Silver Nanowires

In an environment shielded from light, 1.04 parts by mass of the N-(2-hydroxyethyl)acrylamide polymer that had been produced in Synthesis Example 1, and 97.9 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of ethylene glycol and 0.0064 part by mass of ammonium chloride. The temperature of the resulting mixture was raised to 140° C., and the mixture was stirred for 15 minutes. To the mixture 40.0 parts by mass of ethylene glycol and 1.02 parts by mass of silver nitrate were further added, and the reactants were stirred for 45 minutes at 140° C. Silver nanowires were thus produced. The properties of the produced silver nanowires were measured. The results are shown in Table 3.

Working Example 4: Production of Silver Nanowires

In an environment shielded from light, 2.07 parts by mass of the N-(2-hydroxyethyl)acrylamide polymer that had been produced in Synthesis Example 1, and 97.4 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. The temperature of the obtained solution was decreased to 25° C. To this solution were added 10.0 parts by mass of ethylene glycol and 0.0064 part by mass of ammonium chloride. The resulting mixture was stirred for 15 minutes at 25° C. To the mixture 40.0 parts by mass of ethylene glycol and 0.51 part by mass of silver nitrate were further added, and the reactants were stirred for 15 minutes at 25° C. Subsequently, the temperature of the reactants was raised to 140° C. in 5 minutes, and the reactants were further stirred for 45 minutes. Silver nanowires were thus produced. The properties of the produced silver nanowires were measured. The results are shown in Table 3.

Working Example 5: Production of Silver Nanowires

In an environment shielded from light, 1.04 parts by mass of the N-(2-hydroxyethyl)acrylamide polymer that had been produced in Synthesis Example 1, and 97.4 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. The temperature of the obtained solution was decreased to 25° C. To this solution were added 50.0 parts by mass of ethylene glycol and 1.02 parts by mass of silver nitrate, and the reactants were stirred for 15 minutes at 25° C. Subsequently, the temperature of the reactants was raised to 140° C. in 5 minutes, and the reactants were further stirred for 45 minutes. Silver nanowires were thus produced. The properties of the produced silver nanowires were measured. The results are shown in Table 3.

Working Example 6: Production of Silver Nanowires

In an environment shielded from light, 0.48 part by mass of the N-(2-hydroxyethyl)acrylamide/N,N-dimethylacrylamide copolymer that had been produced in Synthesis Example 2, and 98.5 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 7: Production of Silver Nanowires

In an environment shielded from light, 1.15 parts by mass of the N-(2-hydroxyethyl)acrylamide/N-acryloylmorpholine copolymer that had been produced in Synthesis Example 3, and 97.8 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.0016 part by mass of ammonium chloride. The temperature of the resulting mixture was raised to 140° C., and the mixture was stirred for 15 minutes. To the mixture 40.0 parts by mass of 1,2-propanediol and 1.02 parts by mass of silver nitrate were further added, and the resultant was stirred for 30 minutes at 140° C. Silver nanowires were thus produced. The properties of the produced silver nanowires were measured. The results are shown in Table 3.

Working Example 8: Production of Silver Nanowires

In an environment shielded from light, 1.02 part by mass of the N-(2-hydroxyethyl)acrylamide/methyl methacrylate copolymer that had been produced in Synthesis Example 4, and 98.0 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of ethylene glycol and 0.0064 part by mass of ammonium chloride. The temperature of the resulting mixture was raised to 140° C., and the mixture was stirred for 15 minutes. To the mixture 40.0 parts by mass of ethylene glycol and 1.02 parts by mass of silver nitrate were further added, and the resultant was stirred for 45 minutes at 140° C. Silver nanowires were thus produced. The properties of the produced silver nanowires were measured. The results are shown in Table 3.

Working Example 9: Production of Silver Nanowires

In an environment shielded from light, 1.04 parts by mass of the N-(2-hydroxyethyl)acrylamide polymer that had been produced in Synthesis Example 1 and had a weight average molecular weight of 500,000, 0.89 part by mass of the N,N-dimethylacrylamide polymer that had been produced in Synthesis Example 5, and 97.6 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymers were made to dissolve in the polyol. The temperature of the obtained solution was decreased to 25° C. To this solution were added 10.0 parts by mass of ethylene glycol and 0.0064 part by mass of ammonium chloride. The resulting mixture was stirred for 15 minutes at 25° C. To the mixture 40.0 parts by mass of ethylene glycol and 0.51 part by mass of silver nitrate were further added, and the reactants were stirred for 15 minutes at 25° C. Subsequently, the temperature of the reactants was raised to 140° C. in 5 minutes, and the reactants were further stirred for 45 minutes. Silver nanowires were thus produced. The properties of the produced silver nanowires were measured. The results are shown in Table 3.

Working Example 10: Production of Silver Nanowires

In an environment shielded from light, 1.04 parts by mass of the N-(2-hydroxyethyl)acrylamide polymer that had been produced in Synthesis Example 1, and 97.9 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of 1,2-propanediol and 0.0013 part by mass of lithium chloride. The temperature of the resulting mixture was raised to 140° C., and the mixture was stirred for 15 minutes. To the mixture 40.0 parts by mass of 1,2-propanediol and 1.02 parts by mass of silver nitrate were further added, and the resultant was stirred for 30 minutes at 140° C. Silver nanowires were thus produced. The properties of the produced silver nanowires were measured. The results are shown in Table 3.

Working Example 11: Production of Silver Nanowires

In an environment shielded from light, 1.04 part by mass of the N-(2-hydroxyethyl)acrylamide polymer that had been produced in Synthesis Example 1, and 97.9 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of ethylene glycol and 0.0070 part by mass of sodium chloride. The temperature of the resulting mixture was raised to 140° C., and the mixture was stirred for 15 minutes. To the mixture 40.0 parts by mass of ethylene glycol and 1.02 parts by mass of silver nitrate were further added, and the resultant was stirred for 45 minutes at 140° C. Silver nanowires were thus produced. The properties of the produced silver nanowires were measured. The results are shown in Table 3.

Working Example 12: Production of Silver Nanowires

In an environment shielded from light, 2.07 parts by mass of the N-(2-hydroxyethyl)acrylamide polymer that had been produced in Synthesis Example 1, and 97.4 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. The temperature of the obtained solution was decreased to 25° C. To this solution were added 10.0 parts by mass of ethylene glycol and 0.0387 part by mass of zirconium oxychloride octahydrate. The resulting mixture was stirred for 15 minutes at 25° C. To the mixture 40.0 parts by mass of ethylene glycol and 0.51 part by mass of silver nitrate were further added, and the reactants were stirred for 5 minutes at 25° C. Subsequently, the temperature of the reactants was raised to 140° C. in 5 minutes, and the reactants were further stirred for 45 minutes. Silver nanowires were thus produced. The properties of the produced silver nanowires were measured. The results are shown in Table 3.

Working Example 13: Production of Silver Nanowires

In an environment shielded from light, 0.45 part by mass of the N,N-dimethylacrylamide polymer that had been produced in Synthesis Example 5, and 98.5 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 14: Production of Silver Nanowires

In an environment shielded from light, 0.89 parts by mass of the N,N-dimethylacrylamide polymer that had been produced in Synthesis Example 5, and 98.1 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of ethylene glycol and 0.0016 part by mass of ammonium chloride. The temperature of the resulting mixture was raised to 140° C., and the mixture was stirred for 15 minutes. To the mixture 40.0 parts by mass of ethylene glycol and 1.02 parts by mass of silver nitrate were further added, and the reactants were stirred for 30 minutes at 140° C. Silver nanowires were thus produced. The properties of the produced silver nanowires were measured. The results are shown in Table 3.

Working Example 15: Production of Silver Nanowires

In an environment shielded from light, 0.89 parts by mass of the N,N-dimethylacrylamide polymer that had been produced in Synthesis Example 5, and 98.1 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of ethylene glycol and 0.0064 part by mass of ammonium chloride. The temperature of the resulting mixture was raised to 140° C., and the mixture was stirred for 15 minutes. To the mixture 40.0 parts by mass of ethylene glycol and 1.02 parts by mass of silver nitrate were further added, and the reactants were stirred for 45 minutes at 140° C. Silver nanowires were thus produced. The properties of the produced silver nanowires were measured. The results are shown in Table 3.

Working Example 16: Production of Silver Nanowires

In an environment shielded from light, 1.79 parts by mass of the N,N-dimethylacrylamide polymer that had been produced in Synthesis Example 5, and 97.7 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. The temperature of the obtained solution was decreased to 25° C. To this solution were added 10.0 parts by mass of ethylene glycol and 0.0064 part by mass of ammonium chloride. The resulting mixture was stirred for 15 minutes at 25° C. To the mixture 40.0 parts by mass of ethylene glycol and 0.51 part by mass of silver nitrate were further added, and the reactants were stirred for 15 minutes at 25° C. Subsequently, the temperature of the reactants was raised to 140° C. in 5 minutes, and the reactants were further stirred for 45 minutes. Silver nanowires were thus produced. The properties of the produced silver nanowires were measured. The results are shown in Table 3.

Working Example 17: Production of Silver Nanowires

In an environment shielded from light, 1.08 parts by mass of the N, N-dimethylacrylamide/N-acryloylmorpholine copolymer that had been produced in Synthesis Example 6, and 97.9 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.0016 part by mass of ammonium chloride. The temperature of the resulting mixture was raised to 140° C., and the mixture was stirred for 15 minutes. To the mixture 40.0 parts by mass of 1,2-propanediol and 1.02 parts by mass of silver nitrate were further added, and the resultant was stirred for 30 minutes at 140° C. Silver nanowires were thus produced. The properties of the produced silver nanowires were measured. The results are shown in Table 3.

Working Example 18: Production of Silver Nanowires

In an environment shielded from light, 1.27 parts by mass of the N-acryloylmorpholine polymer that had been produced in Synthesis Example 7, and 97.7 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of ethylene glycol and 0.0064 part by mass of ammonium chloride. The temperature of the resulting mixture was raised to 140° C., and the mixture was stirred for 15 minutes. To the mixture 40.0 parts by mass of ethylene glycol and 1.02 parts by mass of silver nitrate were further added, and the reactants were stirred for 45 minutes at 140° C. Silver nanowires were thus produced. The properties of the produced silver nanowires were measured. The results are shown in Table 3.

Working Example 19: Production of Silver Nanowires

In an environment shielded from light, 2.29 parts by mass of the N,N-diethylacrylamide polymer that had been produced in Synthesis Example 8, and 97.2 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. The temperature of the obtained solution was decreased to 25° C. To this solution were added 10.0 parts by mass of ethylene glycol and 0.0064 part by mass of ammonium chloride. The resulting mixture was stirred for 15 minutes at 25° C. To the mixture 40.0 parts by mass of ethylene glycol and 0.51 part by mass of silver nitrate were further added, and the reactants were stirred for 15 minutes at 25° C. Subsequently, the temperature of the reactants was raised to 140° C. in 5 minutes, and the reactants were further stirred for 45 minutes. Silver nanowires were thus produced. The properties of the produced silver nanowires were measured. The results are shown in Table 3.

Working Example 20: Production of Silver Nanowires

In an environment shielded from light, 0.45 part by mass of the N,N-dimethylacrylamide polymer that had been produced in Synthesis Example 9, and 98.5 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of 1, 2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 21: Production of Silver Nanowires

In an environment shielded from light, 0.45 part by mass of the N,N-dimethylacrylamide/methyl methacrylate copolymer that had been produced in Synthesis Example 14, and 98.5 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 22: Production of Silver Nanowires

In an environment shielded from light, 0.45 part by mass of the N,N-dimethylacrylamide polymer that had been produced in Synthesis Example 10, and 98.5 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 23: Production of Silver Nanowires

In an environment shielded from light, 0.40 part by mass of the N,N-dimethylacrylamide/acrylic acid copolymer that had been produced in Synthesis Example 11, and 98.6 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 24: Production of Silver Nanowires

In an environment shielded from light, 0.45 part by mass of the N,N-dimethylacrylamide/methyl methacrylate copolymer that had been produced in Synthesis Example 15, and 98.5 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 25: Production of Silver Nanowires

In an environment shielded from light, 0.39 part by mass of the N,N-dimethylacrylamide/acrylic acid copolymer that had been produced in Synthesis Example 12, and 98.6 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 26: Production of Silver Nanowires

In an environment not shielded from light, 0.45 part by mass of the N,N-dimethylacrylamide/methyl methacrylate copolymer that had been produced in Synthesis Example 15, and 98.5 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 27: Production of Silver Nanowires

In an environment not shielded from light, 0.90 part by mass of the N,N-dimethylacrylamide/methyl methacrylate copolymer that had been produced in Synthesis Example 15, and 98.1 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.0016 part by mass of ammonium chloride. The temperature of the resulting mixture was raised to 140° C., and the mixture was stirred for 15 minutes. To the mixture 40.0 parts by mass of 1,2-propanediol and 1.02 parts by mass of silver nitrate were further added, and the resultant was stirred for 30 minutes at 140° C. Silver nanowires were thus produced. The properties of the produced silver nanowires were measured. The results are shown in Table 3.

Working Example 28: Production of Silver Nanowires

In an environment not shielded from light, 0.90 part by mass of the N,N-dimethylacrylamide/methyl methacrylate copolymer that had been produced in Synthesis Example 15, and 98.1 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of ethylene glycol and 0.0064 part by mass of ammonium chloride. The temperature of the resulting mixture was raised to 140° C., and the mixture was stirred for 15 minutes. To the mixture 40.0 parts by mass of ethylene glycol and 1.02 parts by mass of silver nitrate were further added, and the resultant was stirred for 45 minutes at 140° C. Silver nanowires were thus produced. The properties of the produced silver nanowires were measured. The results are shown in Table 3.

Working Example 29: Production of Silver Nanowires

In an environment not shielded from light, 1.79 parts by mass of the N,N-dimethylacrylamide/methyl methacrylate copolymer that had been produced in Synthesis Example 15, whose ratio of the mass of the N,N-dimethylacrylamide monomers to that of the methyl methacrylate monomers was 50/50 and whose weight average molecular weight was 7,200, and 97.7 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. The temperature of the obtained solution was decreased to 25° C. To this solution were added 10.0 parts by mass of ethylene glycol and 0.0064 part by mass of ammonium chloride. The resulting mixture was stirred for 15 minutes at 25° C. To the mixture 40.0 parts by mass of ethylene glycol and 0.51 part by mass of silver nitrate were further added, and the reactants were stirred for 5 minutes at 25° C. Subsequently, the temperature of the reactants was raised to 140° C. in 5 minutes, and the reactants were further stirred for 45 minutes. Silver nanowires were thus produced. The properties of the produced silver nanowires were measured. The results are shown in Table 3.

Working Example 30: Production of Silver Nanowires

In an environment not shielded from light, 0.39 part by mass of the N, N-dimethylacrylamide/acrylic acid copolymer that had been produced in Synthesis Example 12, and 98.6 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver nanowires were thus produced. The properties of the produced silver nanowires were measured. The results are shown in Table 3.

Working Example 31: Production of Silver Nanowires

In an environment not shielded from light, 0.77 part by mass of the N, N-dimethylacrylamide/acrylic acid copolymer that had been produced in Synthesis Example 12, and 98.2 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of 1,2-propanediol and 0.0016 part by mass of ammonium chloride. The temperature of the resulting mixture was raised to 140° C., and the mixture was stirred for 15 minutes. To the mixture 40.0 parts by mass of 1,2-propanediol and 1.02 parts by mass of silver nitrate were further added, and the resultant was stirred for 30 minutes at 140° C. Silver nanowires were thus produced. The properties of the produced silver nanowires were measured. The results are shown in Table 3.

Working Example 32: Production of Silver Nanowires

In an environment not shielded from light, 0.77 part by mass of the N, N-dimethylacrylamide/acrylic acid copolymer that had been produced in Synthesis Example 12, and 98.2 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. To this solution were added 10.0 parts by mass of ethylene glycol and 0.0064 part by mass of ammonium chloride. The temperature of the resulting mixture was raised to 140° C., and the mixture was stirred for 15 minutes. To the mixture 40.0 parts by mass of ethylene glycol and 1.02 parts by mass of silver nitrate were further added, and the resultant was stirred for 45 minutes at 140° C. Silver nanowires were thus produced. The properties of the produced silver nanowires were measured. The results are shown in Table 3.

Working Example 33: Production of Silver Nanowires

In an environment not shielded from light, 1.54 parts by mass of the N,N-dimethylacrylamide/acrylic acid copolymer that had been produced in Synthesis Example 12, and 97.9 parts by mass of ethylene glycol were placed in a four-necked flask equipped with a stirrer, a thermometer, and a nitrogen gas-introducing tube, while nitrogen gas was being introduced into the flask. The contents were stirred at 120° C. so that the copolymer was made to dissolve in the polyol. The temperature of the obtained solution was decreased to 25° C. To this solution were added 10.0 parts by mass of ethylene glycol and 0.0064 part by mass of ammonium chloride. The resulting mixture was stirred for 15 minutes at 25° C. To the mixture 40.0 parts by mass of ethylene glycol and 0.51 part by mass of silver nitrate were further added, and the reactants were stirred for 15 minutes at 25° C. Subsequently, the temperature of the reactants was raised to 140° C. in 5 minutes, and the reactants were further stirred for 45 minutes. Silver nanowires were thus produced. The properties of the produced silver nanowires were measured. The results are shown in Table 3.

Working Example 34: Production of Silver Nanowires

In an environment shielded from light, 1.04 parts by mass of the N-(2-hydroxyethyl)acrylamide polymer that had been produced in Synthesis Example 1, and 97.9 parts by mass of 1,2-propanediol were placed in a four-necked flask equipped with a stirrer, a thermometer, and a nitrogen gas-introducing tube, while nitrogen gas was being introduced into the flask. The contents were stirred at 120° C. so that the polymer was made to dissolve in the polyol. To this solution were added 10.0 parts by mass of 1,2-propanediol and 0.0411 part by mass of methoxymethyl triphenylphosphonium chloride.

The temperature of the resulting mixture was raised to 140° C., and the mixture was stirred for 15 minutes. To the mixture 40.0 parts by mass of 1,2-propanediol and 1.02 parts by mass of silver nitrate were further added, and the resultant was stirred for 30 minutes at 140° C. Silver nanowires were thus produced. The properties of the produced silver nanowires were measured. The results are shown in Table 3.

The results of Working Examples 1-34 show that the process of the invention is capable of producing silver nanowires whose length along their major axis ranges from 2.2 µm in Working Example 33 to 551 µm in Working Example 1, depending on the manufacturing conditions. The results of Working Examples 1, 6, 13, and 20-25 especially show that the process provides silver nanowires whose length along their major axis exceeds 180 µm when the manufacturing conditions are such that: the reaction is carried out in an environment shielded from light, the concentration of the chloride ions ranges from 0.05 to 0.15 mmol/kg, and the ratio of the moles of the chloride ions to those of the silver ions (the Cl/Ag molar ratio) ranges from 0.001 to 0.03. As understood from, for example, Working Examples 1-3, an increase in the concentration of the chloride ions serves to shorten the length of the produced silver nanowires along their major axis. As understood from, for example, Working Examples 1-4, an increase in the Cl/Ag molar ratio tends to shorten the length of the produced silver nanowires along their major axis.

Comparative Example 1

In an environment not shielded from light, 67.7 parts by mass of ethylene glycol was placed in a four-necked flask equipped with a stirrer, a thermometer, and a nitrogen gas-introducing tube, while nitrogen gas was being introduced into the flask. The ethylene glycol was heated to 160° C. Then, 0.53 part by mass of a vinylpyrrolidone polymer (manufacturer: KANTO CHEMICAL CO., INC., product name: polyvinylpyrrolidone K=30, molecular weight: 40,000) having been dissolved in 40.6 parts by mass of ethylene glylcol, and 0.53 part by mass of silver nitrate having been dissolved in 40.6 parts by mass of ethylene glycol were dripped to the heated ethylene glycol in 15 minutes, while the contents in the flask were being stirred. The resulting mixture was stirred for 40 minutes at 160° C. Silver nanowires were thus produced. The properties of the produced silver nanowires were measured. The results are shown in Table 4.

This process of Comparative Example 1, which is within the disclosure of patent document 2, produced silver nanowires whose length along their major axis was about 4.3 µm. Although we produced silver nanowires by the same process as in Comparative Example 1, except that the concentration of the chloride ions was changed, we were not able to produce silver nanowires whose length along their major axis exceeded 180 µm. Therefore as shown by the results of Comparative Example 1, the process of which was carried out under the manufacturing conditions that are included in the manufacturing conditions disclosed in patent document 2, the process disclosed in this patent document is not capable of producing various silver nanowires at the manufacture's own option, from those whose length along their major axis is short to those whose length along their major axis is long. Therefore it is understood that the present invention is more excellent than the invention disclosed in patent document 2.

Comparative Example 2

In an environment not shielded from light, 1.11 parts by mass of a vinylpyrrolidone polymer (manufacturer: KANTO CHEMICAL CO., INC., product name: polyvinylpyrrolidone K=30, molecular weight: 40,000), and 147.7 parts by mass of ethylene glycol were placed in a four-necked flask equipped with a stirrer, a thermometer, and a nitrogen gas-introducing tube, while nitrogen gas was being introduced into the flask. The contents were stirred at 25° C. so that the polymer was made to dissolve in the ethylene glycol. To this solution were added 0.0186 part by mass of tetrabutylammonium chloride and 1.13 parts by mass of silver nitrate. The resulting mixture was stirred for 15 minutes at 25° C. Subsequently, the temperature of the mixture was raised to 150° C. in 5 minutes, and the mixture was further stirred for 30 minutes. Silver nanowires were thus produced. The properties of the produced silver nanowires were measured. The results are shown in Table 4.

This process of Comparative Example 2, which is within the disclosure of patent document 3, produced silver nanowires whose length along their major axis was about 13 µm. Although we produced silver nanowires by the same process as in Comparative Example 2, except that the concentration of the chloride ions was changed, we were not able to produce silver nanowires whose length along their major axis exceeded 180 µm. Therefore as shown by the results of Comparative Example 2, the process of which was carried out under the manufacturing conditions that are included in the manufacturing conditions disclosed in patent document 3, the process disclosed in this patent document is not capable of producing various silver nanowires at the manufacture's own option, from those whose length along their major axis is short to those whose length along their major axis is long. Therefore it is understood that the present invention is more excellent than the invention disclosed in patent document 3.

Comparative Example 3

In an environment not shielded from light, 9.34 parts by mass of a vinylpyrrolidone polymer (manufacturer: KANTO CHEMICAL CO., INC., product name: polyvinylpyrrolidone K=30, molecular weight: 40,000), and 124.7 parts by mass of ethylene glycol were placed in a four-necked flask equipped with a stirrer, a thermometer, and a nitrogen gas-introducing tube, while nitrogen gas was being introduced into the flask. The contents were stirred at 130° C. so that the polymer was made to dissolve in the ethylene glycol. To this solution were added 4.8 parts by mass of ethylene glycol, 0.0021 part by mass of ferrous acetylacetonate, and 0.0033 part by mass of sodium chloride. The resulting mixture was stirred for 5 minutes. To the mixture 0.70 part by mass of a concentrated nitric acid solution (70%) was further added, and the resultant was stirred for 5 minutes. Subsequently, 10.46 parts by mass of silver nitrate was added, and the reactants were stirred for 2 hours at 130° C. Silver nanowires were thus produced. The properties of the produced silver nanowires were measured. The results are shown in Table 4.

This process of Comparative Example 3, which is within the disclosure of patent document 4, produced silver nanowires whose length along their major axis was about 18 µm. Although we produced silver nanowires by the same process as in Comparative Example 3, except that the concentration of the chloride ions was changed, we were not able to produce silver nanowires whose length along their major axis exceeded 180 µm. Therefore as shown by the results of Comparative Example 3, the process of which was carried out under the manufacturing conditions that are included in the manufacturing conditions disclosed in patent document 4, the process disclosed in this patent document is not capable of producing various silver nanowires at the manufacture's own option, from those whose length along their major axis is short to those whose length along their major axis is long. Therefore it is understood that the present invention is more excellent than the invention disclosed in patent document 4.

Comparative Example 4

In an environment not shielded from light, 0.0004 part by mass of cuprous chloride and 93.8 parts by mass of ethylene glycol were placed in a four-necked flask equipped with a stirrer, a thermometer, and a nitrogen gas-introducing tube, while nitrogen gas was being introduced into the flask. The contents in the flask were heated to 150° C. Then, 0.34 part by mass of a vinylpyrrolidone polymer (manufacturer: KANTO CHEMICAL CO., INC., product name: polyvinylpyrrolidone K=30, molecular weight: 40,000) having been dissolved in 28.1 parts by mass of ethylene glylcol was added to the contents, which was followed by the addition of 28.1 parts by mass of ethylene glycol and 0.34 part by mass of silver nitrate to the mixture. The resultant was stirred for 1.5 hours at 150° C. Silver nanowires were thus produced. The properties of the produced silver nanowires were measured. The results are shown in Table 4.

This process of Comparative Example 4, which is within the disclosure of non-patent document 2, produced silver nanowires whose length along their major axis was about 8.5 µm. Although we produced silver nanowires by the same process as in Comparative Example 4, except that the concentration of the chloride ions was changed, we were not able to produce silver nanowires whose length along their major axis exceeded 180 µm. Therefore as shown by the results of Comparative Example 4, the process of which was carried out under the manufacturing conditions that are included in the manufacturing conditions disclosed in non-patent document 2, the process disclosed in this patent document is not capable of producing various silver nanowires at the manufacture's own option, from those whose length along their major axis is short to those whose length along their major axis is long. Therefore it is understood that the present invention is more excellent than the invention disclosed in non-patent document 2.

Comparative Example 5

In an environment not shielded from light, 0.006 part by mass of a vinylpyrrolidone polymer (manufacturer: KANTO CHEMICAL CO., INC., product name: polyvinylpyrrolidone K=90, molecular weight: 360,000), and 58.8 parts by mass of ethylene glycol were placed in a four-necked flask equipped with a stirrer, a thermometer, and a nitrogen gas-introducing tube, while nitrogen gas was being introduced into the flask. The contents in the flask were stirred at 120° C. so that the polymer was made to dissolve in the ethylene glycol. To this solution were added 10.0 parts by mass of ethylene glycol, 0.0004 part by mass of sodium chloride, and 0.006 part by mass of silver nitrate. The temperature of the resulting mixture was raised to 160° C., and the mixture was stirred for 15 minutes. To the mixture 80.0 parts by mass of ethylene glycol, 0.594 part by mass of a vinylpyrrolidone polymer (manufacturer: KANTO CHEMICAL CO., INC., product name: polyvinylpyrrolidone K=90, molecular weight: 360,000), and 0.594 part by mass of silver nitrate. The reactants were stirred for 60 minutes at 160° C. Silver nanowires were thus produced.

The properties of the produced silver nanowires were measured. The results are shown in Table 4.

This process of Comparative Example 5, which is within the disclosure of patent document 5, produced silver nanowires whose length along their major axis was about 15 µm. Although we produced silver nanowires by the same process as in Comparative Example 5, except that the concentration of the chloride ions was changed, we were not able to produce silver nanowires whose length along their major axis exceeded 180 µm. Therefore as shown by the results of Comparative Example 5, the process of which was carried out under the manufacturing conditions that are included in the manufacturing conditions disclosed in patent document 5, the process disclosed in this patent document is not capable of producing various silver nanowires at the manufacture's own option, from those whose length along their major axis is short to those whose length along their major axis is long. Therefore it is understood that the present invention is more excellent than the invention disclosed in patent document 5.

Comparative Example 6

In an environment not shielded from light, 0.64 part by mass of the acrylamide polymer that had been produced in Synthesis Example 13 and had a weight average molecular weight of 468,000, and 98.3 parts by mass of 1,2-propanediol were placed in a four-necked flask equipped with a stirrer, a thermometer, and a nitrogen gas-introducing tube, while nitrogen gas was being introduced into the flask. The contents in the flask were stirred at 120° C. so that the polymer was made to dissolve in the polyol. To this solution were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. The produced was dark brown muddy liquid. The liquid was observed with a scanning electronic microscope. Silver nanowires were not found. Therefore the properties as indices of the quality of silver nanowires were not measured with the obtained liquid.

This comparative example shows that the process in which an acrylamide polymer is used as an agent for controlling the growth of silver nanowires does not bring the advantages of the present invention.

Comparative Example 7

In an environment not shielded from light, 99.0 parts by mass of 1,2-propanediol was placed in a four-necked flask equipped with a stirrer, a thermometer, and a nitrogen gas-introducing tube, while nitrogen gas was being introduced into the flask. The contents in the flask were stirred at 120° C. To this polyol were added 10.0 parts by mass of 1,2-propanediol and 0.00064 part by mass of ammonium chloride. The temperature of the resulting mixture was raised to 130° C., and the mixture was stirred for 15 minutes. To the mixture 40.0 parts by mass of 1,2-propanediol and 1.02 parts by mass of silver nitrate were further added, and the resultant was stirred for 30 minutes at 130° C. Silver-colored precipitates were obtained. The obtained was observed with a scanning electronic microscope. Silver nanowires were not found. Therefore the properties as indices of the quality of silver nanowires were not measured with the obtained precipitates.

This comparative example shows that the process in which the agent for controlling the growth of silver nanowires according to the present invention does not bring the advantages of the invention.

TABLE 3

|  | Silver nanowires | |
| --- | --- | --- |
|  | Length (μm)*[14] | Diameter (nm) |
| Working Example 1 | 551 | 78 |
| Working Example 2 | 131 | 73 |
| Working Example 3 | 25 | 75 |
| Working Example 4 | 7.3 | 68 |
| Working Example 5 | 0.8 | 63 |
| Working Example 6 | 502 | 75 |
| Working Example 7 | 120 | 74 |
| Working Example 8 | 28 | 76 |
| Working Example 9 | 7.8 | 69 |
| Working Example 10 | 121 | 78 |
| Working Example 11 | 26 | 75 |
| Working Example 12 | 6.9 | 68 |
| Working Example 13 | 380 | 85 |
| Working Example 14 | 85 | 75 |
| Working Example 15 | 18 | 75 |
| Working Example 16 | 3.8 | 72 |
| Working Example 17 | 78 | 78 |
| Working Example 18 | 15 | 79 |
| Working Example 19 | 3.2 | 75 |
| Working Example 20 | 288 | 95 |
| Working Example 21 | 267 | 95 |
| Working Example 22 | 315 | 91 |
| Working Example 23 | 290 | 96 |
| Working Example 24 | 188 | 92 |
| Working Example 25 | 210 | 99 |
| Working Example 26 | 130 | 122 |
| Working Example 27 | 36 | 124 |
| Working Example 28 | 9.0 | 119 |
| Working Example 29 | 1.8 | 114 |
| Working Example 30 | 158 | 119 |
| Working Example 31 | 41 | 116 |
| Working Example 32 | 11 | 116 |
| Working Example 33 | 2.2 | 112 |
| Working Example 34 | 17 | 63 |

Note:
*[14]Length denotes the length of silver nanowires along their major axis.

TABLE 4

|  | Silver nanowires | |
| --- | --- | --- |
|  | Length (μm)*[14] | Diameter (nm) |
| Comparative Example 1 | 4.3 | 288 |
| Comparative Example 2 | 13 | 158 |
| Comparative Example 3 | 18 | 151 |
| Comparative Example 4 | 8.5 | 175 |
| Comparative Example 5 | 15 | 198 |
| Comparative Example 6 | — | — |
| Comparative Example 7 | — | — |

In Table 4 "-" denotes that the properties as indices of the quality of silver nanowires were not measured with the product because silver nanowires were not found in it.

INDUSTRIAL APPLICABILITY

The silver nanowires produced by the process of the present invention have a length along their major axis that is capable of being controlled widely. Thus, the silver nanowires may be used, for example, to form transparent conductive films, which will be widely applied to various devices such as materials for electrodes of liquid crystal displays, plasma displays, organic electroluminescent displays, electronic paper, touch panels, thin film amorphous silicon solar cells, and dye sensitized solar cells; electromagnetic shielding materials; and antistatic materials.

We claim:

1. A composition comprising:
   silver nanowires; and
   an agent for controlling the growth of the silver nanowires comprising a polymer obtained by polymerizing polymerizable monomers that contain monomers of a N-substituted (meth)acrylamide,
   where the N-substituted (meth)acrylamide is expressed by general formula (1),

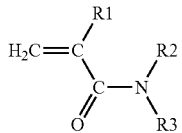

[Formula 1]

wherein R1 denotes a hydrogen atom or a methyl group, R2 a hydrogen atom or an alkyl group having 1-6 carbon atoms, and R3 a hydroxyalkyl group having 1-5 carbon atoms,
   wherein the polymer is produced by polymerizing from 60 to 100% by mass of the monomers of the N-substituted (meth)acrylamide and from 40 to 0% by mass of other polymerizable monomers.

2. The composition according to claim 1, wherein the polymer has a weight average molecular weight in a range of 8,000 to 4,000,000.

3. The composition according to claim 1, wherein the N-substituted (meth)acrylamide is N-(2-hydroxyethyl)acrylamide.

* * * * *